(12) United States Patent
Kandasamy

(10) Patent No.: US 8,572,698 B1
(45) Date of Patent: Oct. 29, 2013

(54) CONNECTING A LEGACY WIRELESS DEVICE TO A WPS-ENABLED ACCESS POINT

(75) Inventor: Ramachandran Kandasamy, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 610 days.

(21) Appl. No.: 12/784,169

(22) Filed: May 20, 2010

(51) Int. Cl.
*H04Q 7/00* (2006.01)

(52) U.S. Cl.
USPC .................... 726/5; 726/4; 370/328; 370/338

(58) Field of Classification Search
USPC ....................................... 726/5; 370/328, 338
See application file for complete search history.

(56) References Cited

U.S. PATENT DOCUMENTS

| 2007/0025371 | A1* | 2/2007 | Krantz et al. | 370/401 |
| 2009/0109897 | A1* | 4/2009 | Woo | 370/328 |
| 2010/0166186 | A1* | 7/2010 | Shiba | 380/278 |
| 2010/0265928 | A1* | 10/2010 | Peng et al. | 370/338 |
| 2010/0299730 | A1* | 11/2010 | Hamachi | 726/5 |

OTHER PUBLICATIONS

"Wi-Fi Certified™ for Wi-Fi Protected Setup™", *Wi-Fi Alliance* http://www.wi-fi.org/wifi-protected-setup Obtained from internet on Dec. 28, 2010, 14 pages.

* cited by examiner

*Primary Examiner* — Jeffrey Pwu
*Assistant Examiner* — Samuel Ambaye
(74) *Attorney, Agent, or Firm* — DeLizio Gilliam, PLLC

(57) ABSTRACT

A direct connection mechanism can be implemented for legacy wireless network devices to securely connect to a WPS-enabled access point. A legacy wireless network device can connect to the WPS-enabled access point and can provide a PIN of the WPS-enabled access point and a predefined keyword that indicates that the wireless network device is not a WPS-enabled wireless network device. In response to determining that the wireless network device is not a WPS-enabled wireless network device, the WPS-enabled access point can switch from a WPS authentication mechanism to a legacy authentication mechanism compliant with legacy wireless network devices. Such a direct connection mechanism enables legacy wireless network devices to connect to the WPS-enabled access point using the same connection model as would a WPS-enabled wireless network device (without a user having to manually configure underlying protocols and without changing implementation of the legacy wireless network device).

20 Claims, 4 Drawing Sheets

CONNECTING A LEGACY WIRELESS DEVICE TO A WPS-ENABLED ACCESS POINT

BACKGROUND

Embodiments of the inventive subject matter generally relate to the field of wireless communication networks and, more particularly, to connecting legacy wireless devices to a Wi-Fi® protected setup (WPS) enabled access point.

The WPS protocol, developed by the Wi-Fi Alliance®, allows wireless devices to interoperate with each other to establish a wireless home network. Typically, a WPS-enabled wireless device connects to a WPS-enabled access point via a personal identification number (PIN) method or via a push button configuration (PBC) method. In the PIN method, a user initiates connection between the WPS-enabled wireless device and the WPS-enabled access point based on knowledge of the PIN associated with the WPS-enabled access point. In the PBC method, the user initiates connection between the WPS-enabled wireless device and the WPS-enabled access point by pushing a button (either a physical button or a virtual button on a configuration screen) on the WPS-enabled access point and on the WPS-enabled wireless device.

SUMMARY

Various embodiments for connecting legacy wireless devices to a WPS-enabled access point are disclosed. In one embodiment, a Wi-Fi Protected Setup (WPS) enabled access point receives a personal identification number (PIN) associated with the WPS enabled access point from a wireless network device. An identity request message is transmitted from the WPS-enabled access point to the wireless network device. At the WPS-enabled access point, it is determined whether or not the wireless network device is configured as a WPS-enabled access point based, at least in part, on identification information included in an identity response message received from the wireless network device. In response to determining that the wireless network device is not configured as a WPS-enabled wireless network device, the WPS-enabled access point switches from a first authentication protocol used for authenticating WPS-enabled wireless network devices to a second authentication protocol used for authenticating wireless network devices that are not configured as WPS-enabled wireless network devices. The WPS-enabled access point attempts to authenticate the wireless network device in accordance with the second authentication protocol.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
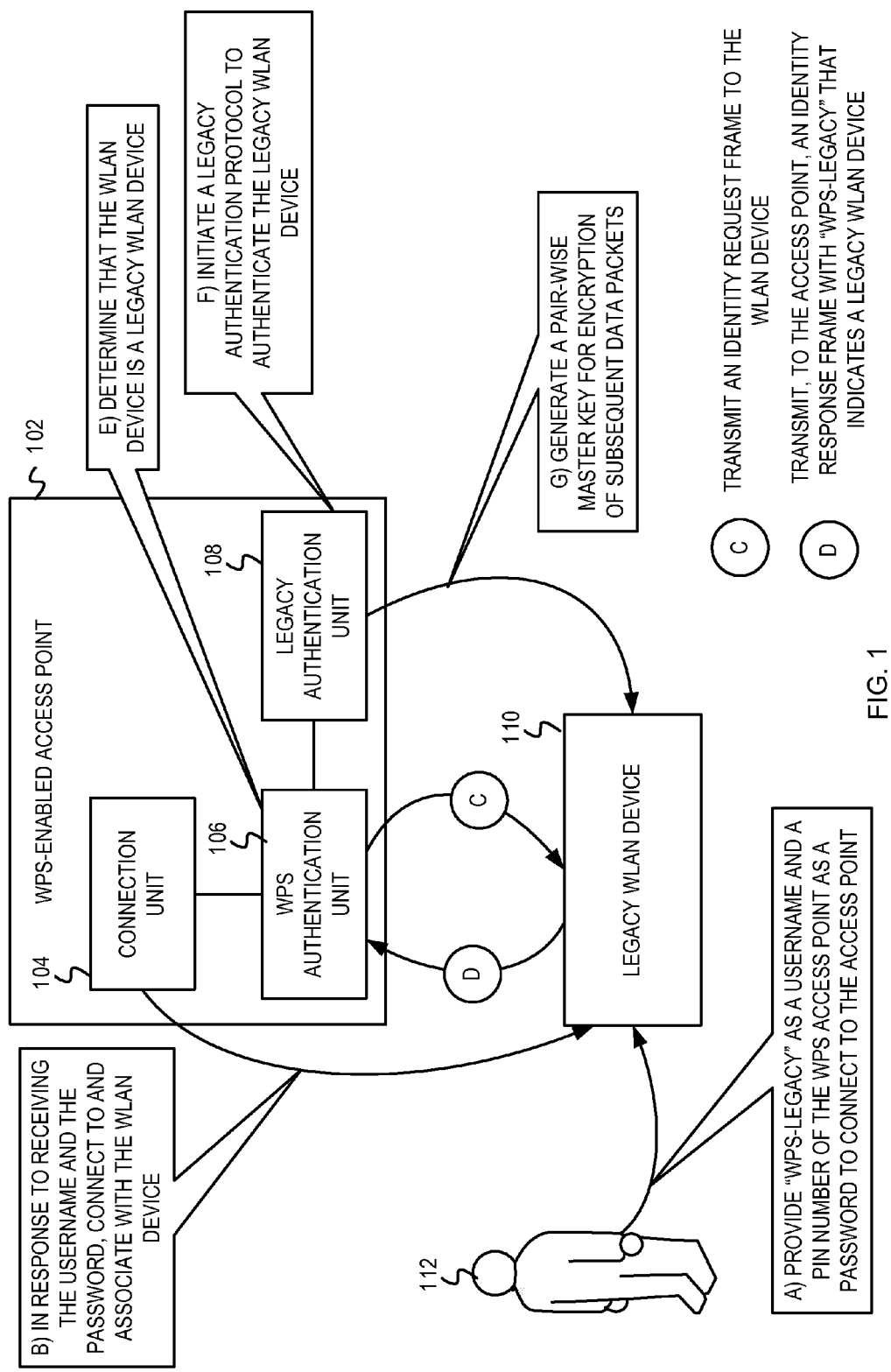
FIG. 1 depicts a block diagram illustrating example operations for establishing a connection between a legacy WLAN device and a WPS-enabled access point.

The description that follows includes exemplary systems, methods, techniques, instruction sequences, and computer program products that embody techniques of the present inventive subject matter. However, it is understood that the described embodiments may be practiced without these specific details. For instance, although examples refer to a legacy wireless local area network (WLAN) device connecting to a WPS-enabled access point using a WPS connection model, connection techniques as described below may be implemented for other wireless standards and devices, e.g., WiMAX, ZigBee®, Wireless USB devices, Bluetooth, etc. In other instances, well-known instruction instances, protocols, structures, and techniques have not been shown in detail in order not to obfuscate the description.

The WPS protocol allows for easy wireless connection between WPS-enabled devices without requiring a user to be aware of configuration information. For example, the WPS protocol enables a WPS-enabled WLAN device to connect to a WPS-enabled access point without requiring the user to be aware of underlying protocols, security mechanisms, access point profile information (e.g., a pre-shared key (PSK), connection and network setup, messaging techniques, etc. However, procedures for connecting a legacy WLAN device (e.g., a WLAN device that does not support the WPS protocol) to the WPS-enabled access point are complex and require the user to have knowledge of the configuration information. For example, to connect the legacy WLAN device to the WPS-enabled access point, the WPS-enabled access point may have to display a randomly generated PSK to the user. The user then manually configures the PSK at the legacy WLAN device to enable the legacy WLAN device to connect to the WPS-enabled access point. Explicitly displaying the PSK to the user to enable connection between the legacy WLAN device and the WPS-enabled access point can result in a security lapse if an unauthorized person intercepts the PSK. For security purposes, the WPS-enabled access point is configured to randomly generate a new PSK when the WPS-enabled access point is reset. Thus, the user has to determine the new PSK and reconfigure the legacy WLAN device with the new PSK so that the legacy WLAN device can reconnect to the WPS-enabled access point each time the access point is reset. Moreover, to enable the legacy WLAN device to connect to the WPS-enabled access point, the user may have to be aware of and to manually configure the underlying protocols. This can be a complicated procedure and can result in interoperability issues.

A WPS-enabled access point can be configured to automatically establish a secure WPS connection with a legacy WLAN device using a PIN of the WPS-enabled access point, without requiring a user to have knowledge of the configuration information. During a connection stage, the user can provide the PIN of the WPS-enabled access point to identify the WPS-enabled access point. The user can also provide other predefined login credentials to indicate that the WLAN device is not a WPS-enabled WLAN device. The WPS-enabled access point can be configured to switch from a WPS authentication protocol to a legacy authentication protocol, on determining that the WLAN device attempting to connect to the WPS-enabled access point is a legacy WLAN device. Once the legacy WLAN device is authenticated, the WPS-enabled access point and the legacy WLAN device can generate an encryption key for encrypting subsequent communications. Thus, the legacy WLAN device need not implement a complex procedure for connecting to the WPS-enabled access point. From the user's point of view, the user need not determine and enter the PSK (to connect the legacy WLAN device to the WPS-enabled access point) every time the WPS-enabled access point reconfigures the PSK. In other words, the legacy WLAN device can connect to the WPS-enabled access point using the same connection model as would a WPS-enabled WLAN device (e.g., based on knowledge of the WPS-enabled access point's PIN), without changing the software or hardware of the legacy WLAN device. Also, since the WPS-enabled access point does not have to reveal the PSK to the user, the legacy WLAN device can connect to the WPS-enabled access point without compromising the security of the PSK. Additionally, by automatically connecting the legacy WLAN device to the WPS-enabled access point, interoperability issues between the legacy WLAN device and the WPS-enabled access point can be minimized.

FIG. 1 depicts a block diagram illustrating example operations for establishing a connection between a legacy WLAN device and a WPS-enabled access point. FIG. 1 depicts a legacy WLAN device 110 and a WPS-enabled access point 102. The WPS-enabled access point 102 comprises a connection unit 104, a WPS authentication unit 106, and a legacy authentication unit 108. During a configuration stage, a network administrator (e.g., in a home, community, business, etc.) configures the WPS-enabled access point 102 by entering a personal identification number (PIN) at the WPS-enabled access point 102. The PIN may be a random 8-digit number, or a number of any suitable length, that uniquely identifies the WPS-enabled access point 102. In some implementations, the network installer may enter a service set identifier (SSID), an access point name, or other combination of letters, numbers, and symbols that uniquely identifies the WPS-enabled access point 102. The network installer may determine the PIN from a label affixed to the WPS-enabled access point 102, from a configuration file of the WPS-enabled access point 102, or from a user manual or other documentation of the WPS-enabled access point 102. After the WPS-enabled access point 102 is configured, WPS-enabled WLAN devices and legacy WLAN devices can be connected to the WPS-enabled access point 102.

At stage A, a user 112 enters login credentials to connect the legacy WLAN device 110 to the WPS-enabled access point 102. For example, the user 112 may enter a username and a password as the login credentials to initiate a connection with the WPS-enabled access point 102. The login credentials may comprise a predefined keyword as a username to indicate that the WLAN device 110 is not a WPS-enabled WLAN device. The login credentials may comprise a password that identifies the WPS-enabled access point 102 to which the legacy WLAN device 110 is attempting to connect. For example, the user 112 can enter "WPS-Legacy" as the username to indicate that the WLAN device 110 is a legacy WLAN device (i.e., is not configured to support a WPS protocol). The user 112 can enter the PIN of the WPS-enabled access point 102 as the password to initiate a wireless connection between the legacy WLAN device 110 and the WPS-enabled access point 102. It is noted that in other implementations, the WPS-enabled access point 102 can be configured to receive other suitable predefined keywords as the username. It is also noted that the user 112 may enter another suitable identifier that uniquely identifies the WPS-enabled access point 102 to initiate a connection between the legacy WLAN device 110 and the WPS-enabled access point 102. For example, the user 112 may provide other suitable predefined combination of letters, numbers, symbols, etc. as the username to indicate whether the WLAN device is a WPS enabled WLAN device or a legacy WLAN device. It is also noted that if the WLAN device 110 is a WPS-enabled device, then the user 112 may only provide the PIN of the WPS-enabled access point 102 to the WPS-enabled WLAN device and/or the user 112 may provide a PIN of the WPS-enabled WLAN device to the WPS-enabled access point 102.

At stage B, in response to receiving the login credentials, the connection unit 104 in the WPS-enabled access point 102 connects to and associates with the legacy WLAN device 110. On receiving the login credentials, the connection unit 104 authenticates the legacy WLAN device 110 and associates with the legacy WLAN device 110. In some implementations, the authentication and association procedure described with reference to stage B may be implemented by the connection unit 104 to create an encrypted channel to further authenticate the WLAN device 110 and to generate an encryption key for subsequent communications, as will be further described below in stages C-G.

At stage C, the WPS authentication unit 106 transmits an identity request frame to the WLAN device 110. The WPS authentication unit 106 initiates a WPS authentication protocol by transmitting the identity request frame to the WLAN device 110 after the connection unit 104 connects to and associates with the WLAN device 110. The identity request frame includes a request to transmit identification information associated with the WLAN device 110. In one implementation, the WPS authentication unit 106 transmits an EAP-identity request frame requesting the WLAN device 110 to transmit an EAP-identity. Based on the identification information transmitted by the WLAN device 110, the WPS authentication unit 106 can determine whether or not the WLAN device 110 is a WPS-enabled WLAN device.

At stage D, the WLAN device 110 transmits, to the access point 102, an identity response frame with "WPS-Legacy" in the body of the identity response frame. The WLAN device 110 transmits "WPS-Legacy" as the identification information to indicate that the WLAN device 110 is a legacy WLAN device that is attempting to connect to the WPS-enabled access point 102 using a WPS connection model. In some implementations, the WLAN device transmits the username (in this case "WPS-Legacy") inputted by user 112 as part of the identity response frame. In other implementations, the WLAN device 110 can transmit another suitable predefined keyword that indicates, to the WPS-enabled access point 102, that the WLAN device 110 is not a WPS-enabled device. In other implementations, other predefined information such as a predefined combination of numbers, letters, symbols, etc. can be transmitted to the WPS-enabled access point 102 to indicate that the WLAN device 110 is a legacy WLAN device.

At stage E, the WPS authentication unit 106 determines that the WLAN device 110 is a legacy WLAN device. The WPS authentication unit 106 receives the identity response frame from the WLAN device 110 and reads the identification information provided in the identity response frame. The WPS authentication unit 106 determines that the identification information is "WPS-Legacy" and consequently determines that the WLAN device 110 is not a WPS-enabled WLAN device. It is noted, however, that in other implementations, the identification information included in the identity response frame can be another suitable predefined keyword that indicates that the WLAN device 110 is not a WPS-enabled WLAN device. The identification information can be any suitable keyword that is recognized by the WPS-enabled access point 102 to indicate a legacy WLAN device. In one example, the predefined keyword may be preconfigured, e.g., by a manufacturer, as part of hardware or software of the WPS-enabled access point 102. In another example, a network administrator or an installer of the WPS-enabled access point 102 may change a previously configured keyword and reconfigure the predefined keyword that indicates a legacy WLAN device. On determining that the WLAN device 110 is not a WPS-enabled WLAN device, the WPS authentication unit 106 directs the legacy authentication unit 108 to initiate a legacy authentication protocol to authenticate the legacy WLAN device 110. It is noted that if the WPS authentication unit 106 determines, based on the identification information received in the identity response frame, that the WLAN device is a WPS-enabled WLAN device, the WPS authentication unit 106 implements the WPS authentication protocol (e.g., extensible authentication protocol-Wi-Fi simple configuration (EAP-WSC)) to authenticate the WPS-enabled WLAN device.

At stage F, the legacy authentication unit 108 initiates the legacy authentication protocol to authenticate the legacy WLAN device 110. As part of the legacy authentication protocol, the legacy authentication unit 108 can validate the username and PIN against predetermined login credentials. If the username and PIN are validated, the legacy authentication unit 108 deems authentication of the legacy WLAN device 110 to be successful. Accordingly, the legacy authentication unit 108 can provide an "authentication successful" message to the legacy WLAN device 110. It is noted that in some embodiments, the legacy authentication unit 108 may only validate the PIN against the predetermined login credentials (e.g., a preconfigured password) to determine whether or not authentication of the legacy WLAN device 110 is successful. The legacy authentication unit 108 can implement protected extensible authentication protocol-Microsoft® challenge handshake authentication protocol (PEAP-MSCHAP v1/v2) or another suitable authentication protocol supported by the legacy WLAN device (e.g., other EAP-based authentication protocols). For example, the legacy authentication unit 108 can exchange handshake messages (e.g., challenge request, challenge response, etc.) with the legacy WLAN device 110 as part of PEAP-MSCHAP v2 to authenticate the legacy WLAN device 110. In one implementation, the legacy authentication unit 108 automatically attempts to authenticate to the legacy WLAN device 110 using a default legacy authentication protocol (e.g., a commonly used authentication protocol compliant with legacy WLAN devices, such as PEAP-MSCHAP v2). In another implementation, the legacy authentication unit 108 may query the legacy WLAN device 110 to determine one or more authentication protocols supported by the legacy WLAN device 110. Based on a query response received from the legacy WLAN device 110, the legacy authentication unit 108 can select and implement an appropriate legacy authentication protocol.

At stage G, the legacy authentication unit 108 generates a pair-wise master key (PMK) as part of the legacy authentication protocol. The legacy authentication unit 108 transmits the PMK to the legacy WLAN device 110. The access point 102 and the legacy WLAN device 110 generate their respective pair-wise transient keys (PTK) to encrypt subsequent data packets exchanged between the access point 102 and the legacy WLAN device 110.

It is noted that the operations described in FIG. 1 can be performed in conjunction with existing operations for connecting legacy WLAN devices to WPS-enabled access points. In some implementations, the user 112 may have an option of using either existing techniques to connect the legacy WLAN device 110 to the WPS-enabled access point 102 (e.g., determining the PSK from the WPS-enabled access point 102, entering the PSK at the legacy WLAN device 110, etc.) or entering the PIN of the WPS-enabled access point 102 and a predefined keyword to connect to the WPS-enabled access point (as described in FIG. 1).

Figure 2:
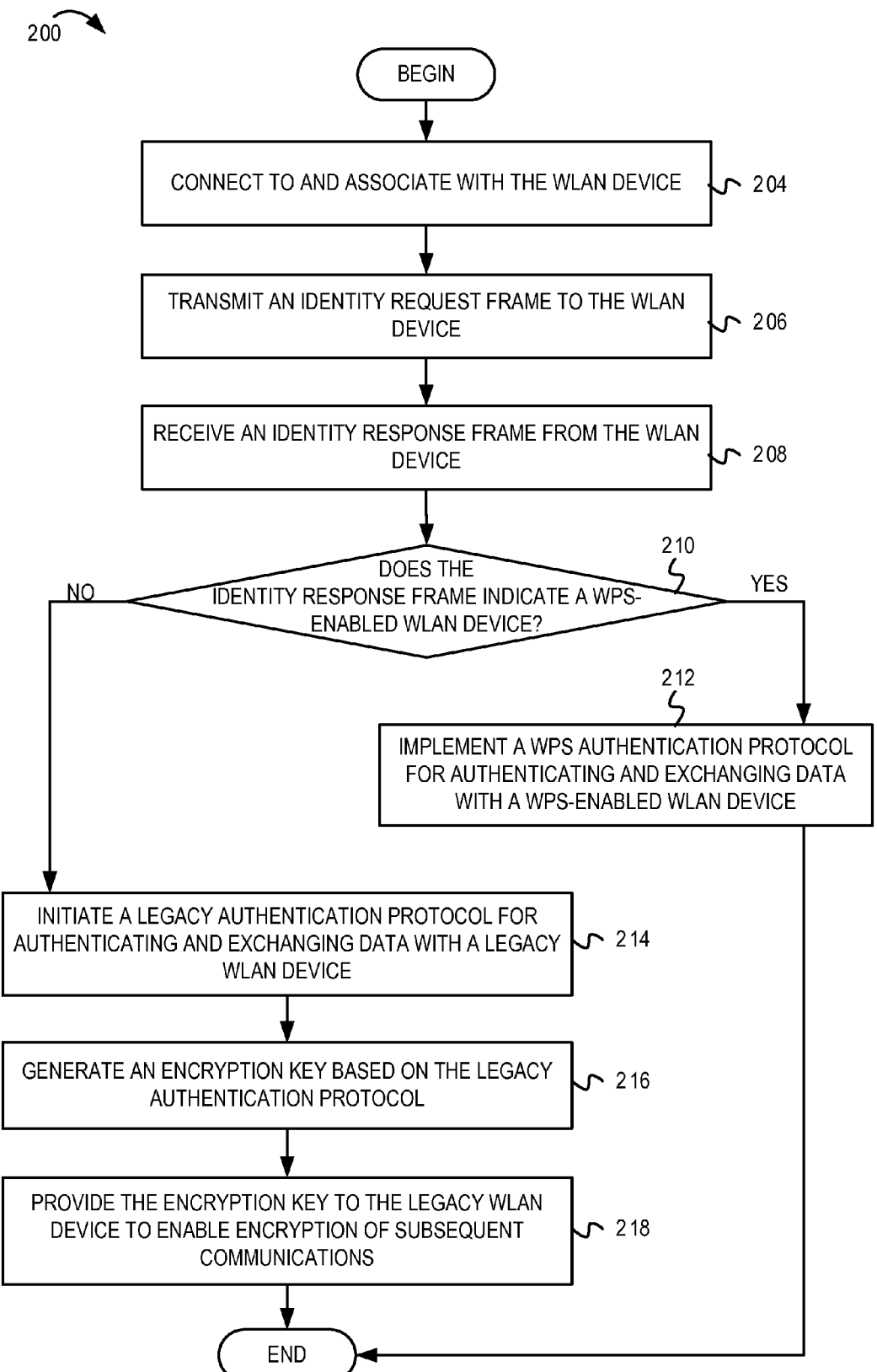
FIG. 2 depicts a flow diagram illustrating example operations for establishing a connection between a legacy WLAN device and a WPS-enabled access point.

FIG. 2 is a flow diagram ("flow") 200 illustrating example operations for establishing a connection between a legacy WLAN device and a WPS-enabled access point. The flow 200 begins at block 204.

At block 204, a WPS-enabled access point connects to and associates with a WLAN device. For example, the connection unit 104 of the WPS-enabled access point 102 connects to and associates with the WLAN device 110. The connection unit 104 can connect to the WLAN device 110 in response to receiving a PIN of the WPS-enabled access point 102. As described above with reference to FIG. 1, a user 112 may enter the PIN of the WPS-enabled access point 102 as a password while providing login credentials at the WLAN device 110. The WLAN device 110 can transmit an association request frame to the WPS-enabled access point 102 and indicate capability information (e.g., supported data rates, a listen interval, etc.) of the WLAN device 110. The WPS-enabled access point 102 can, in turn, transmit an association response frame and assign an association identifier to the WLAN device 110. The flow continues at block 206.

At block 206, an identity request frame is transmitted to the WLAN device. For example, as was described above in FIG. 1, a WPS authentication unit 106 of the WPS-enabled access point 102 initiates a WPS authentication protocol and transmits the identity request frame to the WLAN device 110. The WPS authentication unit 106 may transmit the identity request frame to the WLAN device 110 after the connection unit 104 successfully connects to and associates with the WLAN device 110. For example, after the connection unit 104 exchanges probe request and response frames with the WLAN device 110, authenticates the WLAN device 110, and exchanges association request and response frames with the WLAN device 110, the WPS authentication unit 106 may transmit the identity request frame to the WLAN device 110. The flow continues at block 208.

At block 208, an identity response frame is received from the WLAN device. For example, the WPS authentication unit 106 receives the identity response frame from the WLAN device 110. In one embodiment, in the identity response frame, the WLAN device 110 transmits identification information that indicates whether or not the WLAN device 110 is a WPS-enabled WLAN device. In some implementations, as described above with reference to FIG. 1, the user 112 may enter a username while providing the login credentials at the WLAN device 110. The WLAN device 110 may transmit the username as the identification information. For example, the WLAN device 110 may transmit the predefined keyword "WPS-Legacy" (which the user 112 entered for the username) in the identity response frame to indicate that the WLAN device 110 is a legacy WLAN device and is not a WPS-enabled WLAN device. As another example, the WLAN device 110 may transmit any suitable WPS identity (e.g., as defined by a WPS specification) to indicate whether the WLAN device 110 is a WPS-enabled WLAN device. The flow continues at block 210.

At block 210, it is determined whether the identity response frame indicates a WPS-enabled WLAN device. For example, the WPS authentication unit 106 determines whether the WLAN device is a WPS-enabled WLAN device based on the identification information received in the identity response frame. For example, based on determining that the identification information received in the identity response frame was "WPS-Legacy", the WPS authentication unit 106 may determine that the WLAN device 110 that transmitted the identity response frame is a legacy WLAN device. The WPS authentication unit 106 may compare the identification information received in the identity response frame to preconfigured identities (e.g., as defined by the WPS specification) to determine whether the WLAN device 110 is a WPS-enabled WLAN device. If the WPS authentication unit 106 determines that the identity response frame indicates a WPS-enabled WLAN device, the flow continues at block 212. Otherwise, the flow continues at block 214.

At block 212, a WPS authentication protocol for authenticating and exchanging data with a WPS-enabled WLAN device is implemented. For example, the WPS authentication unit 106 implements an extensible authentication protocol-Wi-Fi simple configuration (EAP-WSC) or other suitable WPS authentication protocol for authenticating the WPS-enabled WLAN device. The WPS authentication unit 106 can initiate a WPS handshake mechanism to authenticate the WPS-enabled WLAN device. After the WPS authentication unit 106 authenticates the WPS-enabled WLAN device, the WPS authentication unit 106 can transmit access point profile information such as a primary shared key (PSK) generated by the WPS-enabled access point 102 via a secure, encrypted channel. On receiving the PSK, the WPS-enabled WLAN device can disconnect from the WPS-enabled access point 102 and can reconnect to the WPS-enabled access point 102 using the PSK. From block 212, the flow ends.

At block 214, a legacy authentication protocol for authenticating and exchanging data with a legacy WLAN device is initiated. For example, the legacy authentication unit 108 initiates a legacy authentication protocol that may be compliant with the legacy WLAN device 110. The flow 200 moves from block 210 to block 214 on determining that the identity response frame indicates a legacy WLAN device. As described above, the WPS authentication unit 106 can determine that the WLAN device 110 is not a WPS-enabled WLAN device based on receiving "WPS-Legacy" (or another predefined keyword that indicates a legacy WLAN device) as identification information in the identity response frame. The WPS authentication unit 106 can suspend the WPS authentication protocol (e.g., EAP-WSC) and can direct the legacy authentication unit 108 to initiate operations for authenticating the legacy WLAN device 110. The legacy authentication unit 108 may initiate an EAP authentication protocol such as PEAP-MSCHAPv2 or other suitable legacy authentication protocol. In one implementation, the legacy authentication unit 108 can automatically attempt to authenticate to the legacy WLAN device 110 using a default legacy authentication protocol (e.g., PEAP-MSCHAP v2). In another implementation, the legacy authentication unit 108 can query the legacy WLAN device 110 for a list of authentication protocols supported by the legacy WLAN device 110. The legacy WLAN device 110 can communicate, to the legacy authentication unit 108, one or more authentication protocols supported by the legacy WLAN device 110. Accordingly, the legacy authentication unit 108 can implement an appropriate protocol to authenticate the legacy WLAN device 110. As part of the legacy authentication protocol, the legacy authentication unit 108 can validate the username and password (i.e., the PIN of the WPS-enabled access point) against predetermined login credentials. If the username and PIN are validated, the legacy authentication unit 108 deems authentication of the legacy WLAN device 110 to be successful. Accordingly, the legacy authentication unit 108 can provide an "authentication successful" message to the legacy WLAN device 110. It is noted that if the username and PIN are not validated, the legacy authentication unit 108 deems authentication of the legacy WLAN device 110 to be unsuccessful and provides an "authentication failed" message to the legacy WLAN device 110. Furthermore, in some embodiments, the legacy authentication unit 108 may only validate the PIN against the predetermined login credentials (e.g., a preconfigured password) to determine whether or not authentication of the legacy WLAN device 110 is successful. The flow continues at block 216 after the WLAN device 110 is authenticated.

At block 216, an encryption key is generated based on the legacy authentication protocol. For example, the legacy authentication unit 108 generates the encryption key after authenticating the legacy WLAN device 110. As an example, if the legacy authentication unit 108 implements PEAP-MSCHAP v2, the legacy authentication unit 108 transmits a challenge request to the legacy WLAN device 110, receives a challenge response, and verifies the legacy WLAN device's credentials. At the end of the authentication process, the legacy authentication unit 108 and the legacy WLAN device 110 agree upon a pair-wise master key (PMK). The PMK is a symmetric key and can be used to encrypt communications exchanged during a single communication session between the legacy WLAN device 110 and the WPS-enabled access point 102. The flow continues at block 218.

At block 218, the encryption key is provided to the legacy WLAN device to enable encryption of subsequent communications. For example, the legacy authentication unit 108 provides the PMK (determined at block 216) to the legacy WLAN device 110 to enable encryption of subsequent communication between the WPS-enabled access point 102 and the legacy WLAN device 110. The legacy WLAN device 110 can then derive a pair-wise transient key (PTK) from the PMK and encrypt subsequent data packets (or management packets) intended for the WPS-enabled access point 102 with the PTK. From block 218, the flow ends.

Figure 3:
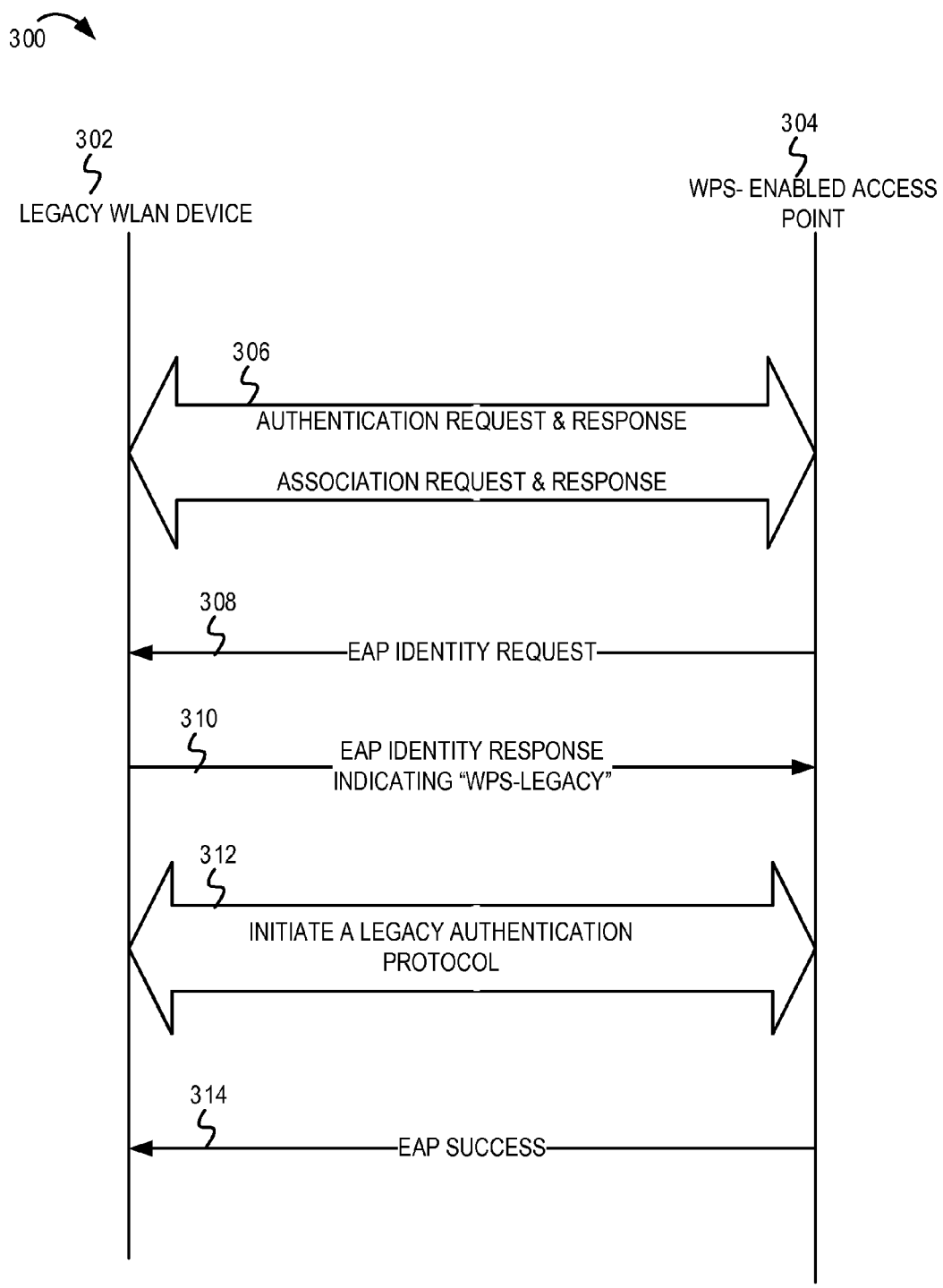
FIG. 3 is a sequence diagram illustrating example operations for establishing a connection between a legacy WLAN device and a WPS-enabled access point.

FIG. 3 is a sequence diagram illustrating example operations for establishing a connection between a legacy WLAN device and a WPS-enabled access point. FIG. 3 depicts a legacy WLAN device 302 and a WPS-enabled access point 304. To connect the WLAN device 302 to the WPS-enabled access point 304, a user enters a predefined keyword as a username and a predetermined password. For example, the user may enter "WPS-Legacy" as the username and the WPS-enabled access point's PIN as the password. It is noted that any suitable predefined keyword may be entered as the username to indicate whether the WLAN device 302 is a legacy WLAN device. The legacy WLAN device 302 initiates an authentication and association process 306 with the WPS-enabled access point 304. After successful exchange of authentication and association frames 306, the WPS-enabled access point 304 transmits an EAP-identity request frame 308 to the WLAN device 302. In response to receiving the EAP-identity request frame 308, the WLAN device 302 transmits an EAP-identity response frame 310 indicating "WPS-Legacy" in the body of the identity response frame 310. By transmitting "WPS-Legacy" as the identification information, the WLAN device 302 notifies the WPS-enabled access point 304 that the WLAN device 302 is not a WPS-enabled WLAN device. By providing the PIN of the WPS-enabled access point 304 as the password, the legacy WLAN device 302 can connect to the WPS-enabled access point 304 using the same WPS connection model as would a WPS-enabled WLAN device.

Responsive to determining that the WLAN device 302 is not a WPS-enabled WLAN device, the WPS-enabled access point 304 switches from a WPS authentication protocol (e.g., EAP-WSC) to a legacy authentication protocol 312 (e.g., PEAP-MSCHAP v2). If the WLAN device 302 is successfully authenticated by the legacy authentication protocol, the WPS-enabled access point 304 transmits an EAP success frame 314 to indicate that the WPS-enabled access point 304 successfully authenticated the WLAN device 302. The WLAN device 302 and the WPS-enabled access point 304 can generate an encryption key as part of the legacy authentication protocol 312 to encrypt subsequent communications. However, if the authentication process fails (e.g., because the identification information provided in the identity response frame 310 was incorrect, because a challenge response was incorrect, etc.), the WPS-enabled access point 304 can transmit an EAP failed frame to the WLAN device 302. Subsequently, the WPS-enabled access point 304 can disassociate the WLAN device 302.

It should be understood that FIGS. 1-3 are examples meant to aid in understanding embodiments and should not be used to limit embodiments or limit scope of the claims. Embodiments may perform additional operations, fewer operations, operations in a different order, operations in parallel, and some operations differently. For example, although FIGS. 1-3 describe the legacy WLAN device 110 connecting to the WPS-enabled access point 102 using a PIN method, embodiments are not so limited. In some implementations, the legacy WLAN device 110 can connect to the WPS-enabled access point 102 using a push button configuration (PBC) method. In the PBC method, a user can activate the WPS-enabled access point 102 by pressing a button on the WPS-enabled access point 102. The user can then initiate a connection between the legacy WLAN device 110 and the WPS-enabled access point 102 by providing "WPS-Legacy" as the username as described above and by providing "00000000" as the password. It is noted that in other implementations, another suitable predefined username and password can be provided to connect the legacy WLAN device 110 to the WPS-enabled access point 102 using the PBC method. The WPS-enabled access point 102 can detect, connect to, and authenticate the legacy WLAN device 110 as described with reference to FIGS. 1-3 without exchanging access point profile information, security configurations, PSK, etc.

It is also noted that although FIGS. 1-3 depict the WPS-enabled access point 102 transmitting the identity request frame to the WLAN device 110 and using an appropriate authentication protocol to authenticate the WLAN device 110 depending on whether the WLAN device 110 is a WPS-enabled WLAN device, embodiments are not so limited. In some implementations, a remote server (e.g., a RADIUS server) can transmit the identity request frame to the WLAN device 110 via the WPS-enabled access point 102. The remote server may comprise the WPS authentication server 106 and the legacy authentication server 108 to authenticate the WLAN device 110 using an appropriate authentication protocol. If after the authentication process, the remote server issues an "access granted" message, the WPS-enabled access point 102 can allow the WLAN device 110 to wirelessly connect to and exchange messages with WPS-enabled the access point 102. If the remote server issues an "access failed" message, the WPS-enabled access point 102 can disassociate the WLAN device 110. In other implementations, the WPS-enabled access point 102 can identify the authentication protocol to be used (e.g., EAP-WSC or PEAP-MSCHAPv2) and notify the remote server of the appropriate protocol to be implemented to authenticate the WLAN device 110.

In some implementations, the WLAN device 110 may only provide a PIN of the WPS-enabled access point 102 to connect to and to associate with the WPS-enabled access point 102. The WPS-enabled access point 102 may receive the PIN as the login credential, determine that the received PIN matches the PIN of the WPS-enabled access point (as indicated in a configuration file), and accordingly authenticate the WLAN device 110. After the WLAN device 110 associates with the WPS-enabled access point 102 and receives an identity request frame, the WLAN device 110 can provide the username (e.g., received as a part of the login credentials) as part of the identity response frame. The identification information (e.g., the username) may be provided from the WLAN device 110 to the WPS-enabled access point 102 only after the WLAN device 110 associates with the WPS-enabled access point 102 and an encrypted channel is established between the WPS-enabled access point 102 and the WLAN device 110.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 4:
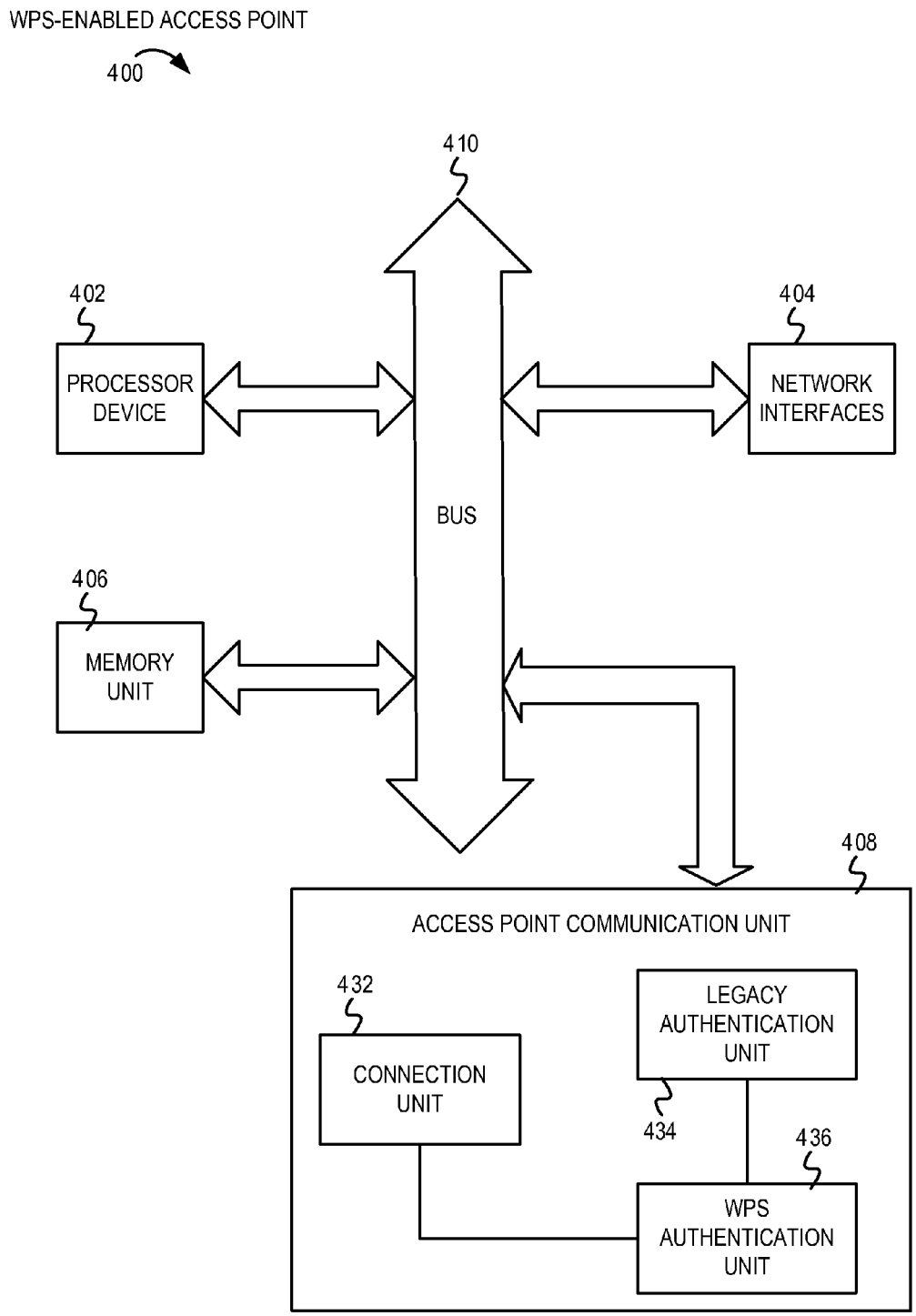
FIG. 4 is a block diagram of one embodiment of a WPS-enabled electronic device including a mechanism for connecting to a legacy WLAN device.

FIG. 4 is a block diagram of one embodiment of a WPS-enabled access point 400 including a mechanism for connecting to a legacy WLAN device. In some embodiments, the WPS-enabled access point 400 can be a standalone system. In another embodiment, the WPS-enabled access point 400 may be embodied in another electronic system such as a personal computer (PC), a workstation, or other electronic system. In another embodiment, the WPS-enabled access point 400 can be embodied in a mobile device, such as a laptop, a netbook, or a mobile phone, which can be configured to have some or all of the functionality of an access point during some modes of operation. The WPS-enabled access point 400 includes a processor device 402 (possibly including multiple processors, multiple cores, multiple nodes, and/or implementing multi-threading, etc.). The WPS-enabled access point 400 includes a memory unit 406. The memory unit 406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The WPS-enabled access point 400 also includes a bus 410 (e.g., PCI, ISA, PCI-Express, HyperTransport®, InfiniBand®, NuBus, etc.), and network interfaces 404 that include at least one wireless network interface (e.g., a WLAN interface, a Bluetooth® interface, a WiMAX interface, a ZigBee® interface, a Wireless USB interface, etc.).

The WPS-enabled access point 400 also includes an access point communication unit 408. The access point communication unit 408 comprises a connection unit 432, a legacy authentication unit 434, and a WPS authentication unit 436. The access point communication unit 408 implements functionality to connect to and to authenticate a legacy WLAN device (e.g., a WLAN device that is not configured to implement WPS protocols) using a WPS connection model (e.g., a PIN-based mechanism or a PBC mechanism), as described above with reference to FIGS. 1-3. It should be noted that any one of the above-described functionalities might be partially (or entirely) implemented in hardware and/or on the processor device 402. For example, the functionality may be implemented with an application specific integrated circuit, in logic implemented in the processor device 402, in a co-processor on a peripheral device or card, etc. Further, realizations may include fewer or additional components not illustrated in FIG. 4 (e.g., additional network interfaces, peripheral devices, etc.). The processor device 402 and the network interfaces 404 are coupled to the bus 410. Although illustrated as being coupled to the bus 410, the memory unit 406 may be coupled to the processor unit 402.

While the embodiments are described with reference to various implementations and exploitations, it will be understood that these embodiments are illustrative and that the scope of the inventive subject matter is not limited to them. In general, techniques for connecting a legacy wireless device to a WPS-enabled access point as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    establishing, at a Wi-Fi Protected Setup (WPS) enabled access point having an associated personal identification number (PIN), a connection from a wireless network device;
    transmitting, from the WPS-enabled access point, an identity request message to the wireless network device;
    receiving an identity response message from the wireless network device, the identity response message including identification information;
    determining, at the WPS-enabled access point, that the wireless network device is not WPS-enabled based, at least in part, on the identification information included in an identity response message received from the wireless network device;
    in response to determining that the wireless network device is not WPS-enabled, switching the connection from a first authentication protocol used for authenticating WPS-enabled wireless network devices to a second authentication protocol used for authenticating legacy wireless network devices that are not WPS-enabled wireless network devices;
    authenticating the wireless network device in accordance with the second authentication protocol in conjunction with the PIN; and
    generating and providing an encryption key to the wireless network device for encryption of subsequent communications between the wireless network device and the WPS-enabled access point.

2. The method of claim 1,
    wherein the WPS-enabled access point is configured to authenticate WPS-enabled wireless network devices in accordance with the first authentication protocol.

3. The method of claim 1, comprising:
    generating a pair-wise master key in accordance with the second authentication protocol; and
    deriving a pair-wise transient key from the pair-wise master key for said encryption of subsequent communications between the wireless network device and the WPS-enabled access point.

4. The method of claim 1, wherein said determining that the wireless network device is not WPS-enabled comprises:
    reading the identification information in the identity response message received from the wireless network device;
    comparing the identification information in the identity response message to a predefined keyword that indicates that the wireless network device is not WPS-enabled; and
    determining that the identification information in the identity response message matches the predefined keyword.

5. The method of claim 1, wherein said establishing the connection with the wireless network device comprises:
    receiving, at the WPS-enabled access point from the wireless network device, the PIN associated with the WPS-enabled access point;
    connecting to the wireless network device based, at least in part, on said receiving, at the WPS-enabled access point, the PIN of the WPS-enabled access point from the wireless network device; and exchanging authentication frames and association frames with the wireless network device based on said connecting to the wireless network device.

6. The method of claim 1, further comprising:
receiving a username including the identification information indicating that the wireless network device is WPS-enabled and a password based upon the PIN associated with the WPS-enabled access point; and
authenticating the wireless network device using the second authentication protocol based on said receiving the username and the password.

7. The method of claim 1, wherein, the identification information included in the identity response message is a predefined keyword indicating that the wireless network device is a legacy wireless network device that is not configured to support WPS protocols.

8. The method of claim 1, wherein the second authentication protocol implemented in the WPS-enabled access point is protected extensible authentication protocol-Microsoft challenge handshake authentication protocol (PEAP-MSC-HAP).

9. The method of claim 1, wherein the first authentication protocol implemented in the WPS-enabled access point is extensible authentication protocol-Wi-Fi simple configuration (EAP-WSC).

10. A Wi-Fi Protected Setup (WPS) enabled access point having an associated personal identification number (PIN), the WPS-enabled access point comprising:
a connection unit operable to:
establish a connection from a wireless network device; and
an authentication unit operable to:
transmit an identity request message to the wireless network device;
receive an identity response message from the wireless network device, the identity response message including identification information;
determine that the wireless network device is not WPS-enabled based, at least in part, on the identification information included in an identity response message received from the wireless network device;
in response to the authentication unit determining that the wireless network device is not WPS-enabled, switch from a first authentication protocol used for authenticating WPS-enabled wireless network devices to a second authentication protocol used for authenticating legacy wireless network devices that are not WPS-enabled wireless network devices;
authenticate the wireless network device in accordance with the second authentication protocol in conjunction with the PIN; and
generate and provide an encryption key to the wireless network device for encryption of subsequent communications between the wireless network device and the WPS-enabled access point.

11. The WPS-enabled access point of claim 10, wherein the authentication unit is further operable to:
authenticate WPS-enabled wireless network devices in accordance with the first authentication protocol.

12. The WPS-enabled access point of claim 10, wherein the authentication unit operable to determine that the wireless network device is not WPS-enabled comprises the authentication unit operable to:
read the identification information in the identity response message received from the wireless network device;
compare the identification information in the identity response message to a predefined keyword that indicates that the wireless network device is not WPS-enabled; and
determine that the identification information in the identity response message matches the predefined keyword.

13. The WPS-enabled access point of claim 10, wherein the authentication unit is operable to:
receive a username including the identification information indicating that the wireless network device is not WPS-enabled and a password based upon the PIN associated with the WPS-enabled access point; and
authenticate the wireless network device using the second authentication protocol based on receiving the username and the password.

14. The WPS-enabled access point of claim 10, wherein the identification information is a predefined keyword indicating that the wireless network device is a legacy wireless network device that is not configured to support WPS protocols.

15. One or more machine-readable storage media, having instructions stored therein, which, when executed by one or more processors causes the one or more processors to perform operations that comprise:
establishing, at a Wi-Fi Protected Setup (WPS) enabled access point having an associated personal identification number (PIN), a connection from a wireless network device;
transmitting, from the WPS-enabled access point, an identity request message to the wireless network device;
receiving an identity response message from the wireless network device, the identity response message including identification information;
determining, at the WPS-enabled access point, that the wireless network device is not WPS-enabled based, at least in part, on identification information included in an identity response message received from the wireless network device;
in response to determining that the wireless network device is not WPS-enabled, switching from a first authentication protocol used for authenticating WPS-enabled wireless network devices to a second authentication protocol used for authenticating legacy wireless network devices that are not WPS-enabled wireless network devices;
authenticating the wireless network device in accordance with the second authentication protocol in conjunction with the PIN; and
generating and providing an encryption key to the wireless network device for encryption of subsequent communications between the wireless network device and the WPS-enabled access point.

16. The machine-readable storage media of claim 15, wherein the operations further comprise:
authenticating WPS-enabled wireless network devices in accordance with the first authentication protocol.

17. The machine-readable storage media of claim 15, wherein said operation of determining that the wireless network device is not WPS-enabled comprises:
reading the identification information in the identity response message received from the wireless network device;
comparing the identification information in the identity response message to a predefined keyword that indicates that the wireless network device is not WPS-enabled; and
determining that the identification information in the identity response message matches the predefined keyword.

18. The machine-readable storage media of claim 15, wherein the operations further comprise:
- receiving a username including the identification information indicating that the wireless network device is not WPS-enabled and a password including the PIN associated with the WPS-enabled access point; and
- authenticating the wireless network device using the second authentication protocol based on said receiving the username and the password.

19. A method performed by a Wi-Fi Protected Setup (WPS) enabled access point having an associated personal identification number (PIN), the method comprising:
- for a connection with a wireless client device:
  - determining, at the WPS enabled access point based upon identification information received from the wireless client device, whether the wireless client device comprises a WPS-enabled wireless network device or a legacy wireless network device, the legacy wireless network device being one that does not support a WPS authentication protocol;
  - selecting, at the WPS enabled access point, an authentication protocol for the connection, the selected authentication protocol being either the WPS authentication protocol or a legacy authentication protocol based upon whether the wireless client device comprises the WPS-enabled wireless network device or the legacy wireless network device, respectively; and
  - authenticating the wireless client device in accordance with the selected authentication protocol in conjunction with the PIN; and
  - generating and providing an encryption key to the wireless client device for encryption of subsequent communications between the wireless client device and the WPS enabled access point.

20. The method of claim 19, wherein said authenticating the wireless client device comprises:
- using the PIN in accordance with the WPS authentication protocol if the wireless client device comprises the WPS-enabled wireless network device; and
- using the same PIN as a password in accordance with the legacy authentication protocol if the wireless client device comprises the legacy wireless network device.

* * * * *